United States Patent
Hartelius

[15] 3,669,469
[45] June 13, 1972

[54] ARTICULATED VEHICLE FRAME
[72] Inventor: Nils Magnus Hartelius, Gothenburg, Sweden
[73] Assignee: Aktiebolaget Volvo, Gothenburg, Sweden
[22] Filed: Dec. 28, 1970
[21] Appl. No.: 101,512

[52] U.S. Cl. ...........................280/492, 180/14 R, 280/111, 280/460 R
[51] Int. Cl. .....................................B62d 53/02
[58] Field of Search.................280/492, 111, 493, 460, 494; 180/51, 52, 14

[56] References Cited

UNITED STATES PATENTS 3,157,239 11/1964 Bernotas..................................180/51
3,414,072 12/1968 Hodges, Jr. et al. ...............280/111 X
3,484,843 12/1969 Martin...............................280/494 X Primary Examiner—Leo Friaglia
Attorney—Young & Thompson

[57] ABSTRACT

An articulated vehicle frame, preferably for cross country vehicles, comprising an articulation mounted between the front and rear wheel axles and dividing the frame in two portions, in which the articulation consists of a universal joint mounted in the longitudinal vertical plane of symmetry of the frame and hingedly connecting the two frame portions with each other and two links mounted on both sides of the universal joint in the longitudinal direction of the frame, which links are rotatably connected with the frame portions in a plane situated below a horizontal plane through the universal joint.

5 Claims, 4 Drawing Figures

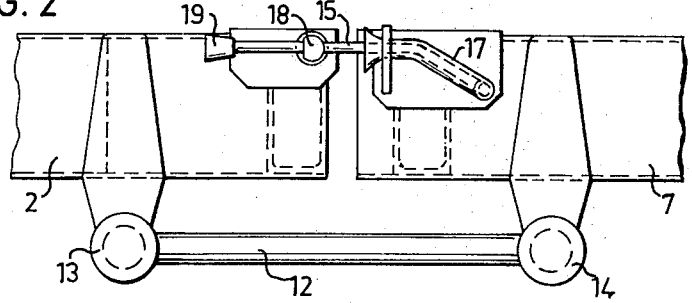
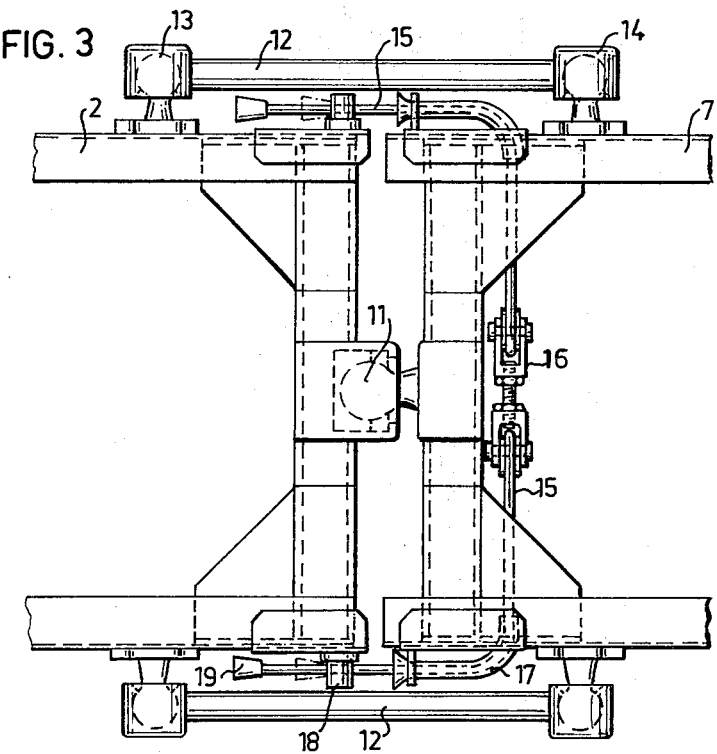
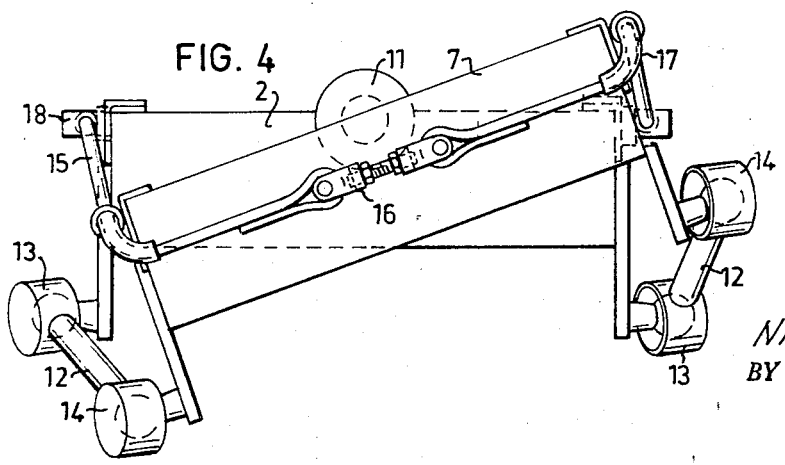
INVENTOR.
NILS MAGNUS HARTELIUS
BY
Young & Thompson
ATTYS.

ARTICULATED VEHICLE FRAME

The invention refers to an articulated frame for vehicles, especially cross country vehicles. For cross country vehicles it is desirable to use a frame which can absorb large torsional movements whereby larger resiliency movements and thereby increased penetrability can be obtained. In cross country driving with conventionally built vehicles having a frame in one unit mounted on front and rear wheels, torsional movements are produced within the frame which thereby is submitted to high stresses, which will also act on the fastenings for the body or the drivers cabin as well as the cargo supporting superstructure. This can cause great damage and also impair the driving qualities of the vehicle.

It is known in order to obtain better cross country driving qualitites for vehicles to mount a turntable on the frame between the front and rear axles so as to divide the frame in two parts, which can be turned relative to each other about the longitudinal axis of the vehicle. In order that a turntable mounted in this manner shall support the enormous bending stresses to which it is submitted, it must have a large diameter, whereby it infringes on the space above and below the frame thereby reducing the free height above ground and the available loading space.

It is an object of the present invention to produce a vehicle frame with an articulation which permits the twisting movements in the frame necessary for cross country driving, which maintains the stability of the frame in the vertical direction and sideways and which eliminates the disadvantages referred to above. According to the invention this is obtained by the fact that the articulation consists of a universal joint mounted in the longitudinal plane of symmetry of the frame and connecting two frame portions with each other, and two links placed in the longitudinal direction of the frame and articulated onto each frame portion in a plane below the horizontal plane passing through the universal joint.

A preferred embodiment of the invention is described in the following with reference to the enclosed drawings.

FIG. 2 is a side view of a part of the articulation.

FIG. 3 is a plane view of the articulation.

FIG. 4 is a diagrammatical end view of the frame portions in a position twisted relative to each other.

Figure 1:
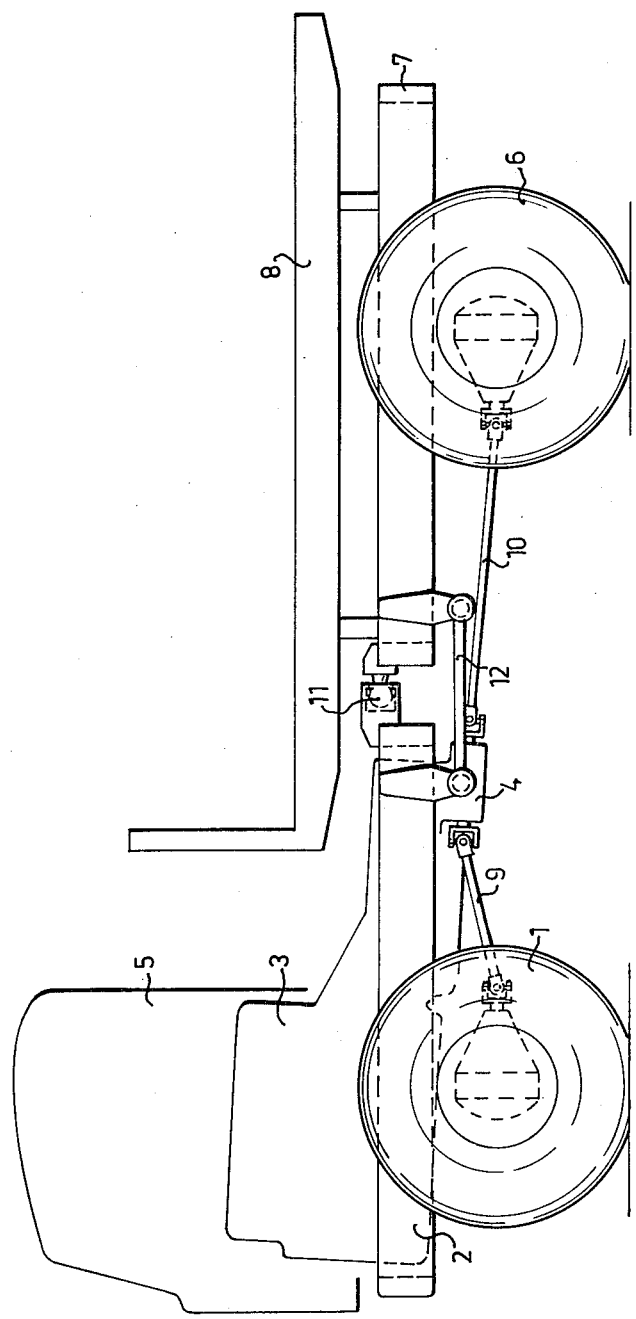
FIG. 1 shows a diagrammatic side elevation of a cross country truck with a divided frame and an articulation according to the invention.

The vehicle shown in FIG. 1 is a four-wheel driven cross country truck, though the invention is not limited to vehicles of this kind. The front wheels 1 of the vehicle support a resiliently suspended frame portion 2 on which a motor 3 with a gear box 4 and other accessories as well as a drivers cabin 5 are mounted. The rear wheels 6 support in a similar manner a frame portion 7 on which a load platform 8 is mounted. Both front and rear wheels are driven from the gear box 4 by universal joint axles 9 and 10. In other applications only one pair of wheels need be driven.

The frame portions 2 and 7 are connected with each other by articulation means consisting of a universal joint, in the case illustrated a ball joint 11 mounted in the longituninal vertical plane of symmetry of the frame portions 2 and 7, and on each side of the universal joint 11 a link in the form of a rigid pulling bar 12, which hingedly connects both frame portions in their longitudinal direction and in a plane situated below the universal joint 11 and symmetrically relative to said joint. The mountings for the pulling links must permit rotation in the vertical plane and also to a certain extent in the horizontal plane and are preferably ball joints. Since the mountings 13, 14 are in a horizontal plane below the universal joint 11 and together with this form a double three-dimensional three-point suspension, all the forces produced by vertical loads on the frame will be in the form of pressure loads on the universal link and of pulling forces in the pulling links.

When the frame portions 2, 7 are turned relative to each other, the horizontal distance between the mountings 13, 14 of the pulling links 12 is reduced and thus the frame portions 2 and 7 will be slightly inclined so that the adjacent ends of the frame portions 2, 7 are slightly lifted relative to the ends at the front and rear wheels. Since the load resting on the frame tends to press the articulation means downwards the latter will strive to take its normal position, i.e. there will be a stable equilibrium, which is of importance from the point of view of pitching.

With the articulation according to the invention in cross country driving all the twisting forces, which otherwise would influence the frame, will be absorbed in the articulation in the form of pull and push forces, which permits large twisting angles between the front and rear axles and results in an easier cross country driving.

The twisting must, however, be capable of being limited within a certain angle and therefore the articulation comprises a stop member. This can consist of a wire 15, the length of which can be adjusted e.g. by means of a stretching screw 16, said wire extending through tubes 17 mounted on the two beams of the frame portion 7 and through sleeves 18 on the beams of the frame portion 2. The sleeves 18 are normally opposite the end of the corresponding tube 17. At each end of the wire 15 there is an abutting knob 19 and the sleeves 18 support corresponding abutments. When the frame portions 2, 7 are twisted relative to each other the space between the end of the tube 17 and the sleeve 18 increases, the abutting knobs thereby coming nearer the sleeves 18 until said knobs 19 at a maximum torsion are stopped against the abutments of the sleeves 18 and prevent a further twisting. Since the wire 15 can move in the tubes 17 the load on the sleeves 18 and the abutment knobs 19 at both ends of the wire 15 will be the same so that the loads will be of equal magnitude on both sides of the frame portions.

What I claim is:

1. An articulated vehicle frame, preferably for cross country vehicles, comprising an articulation mounted between the front and rear wheel axles and dividing the frame in two portions, characterized in that the articulation consists of a universal joint mounted in the longitudinal vertical plane of symmetry of the frame and hingedly connecting the two frame portions with each other and two links mounted on both sides of the universal joint in the longitudinal direction of the frame, which links are rotatably connected with the frame portions in a plane situated below a horizontal plane through the universal joint.

2. A vehicle frame as claimed in claim 1, characterized in that the connecting points of the links with the frame portions are mounted symmetrically relative to the universal joint.

3. A vehicle frame as claimed in claim 1, characterized in that the connections of the universal joint and the links are ball joints.

4. A vehicle frame as claimed in claim 1, characterized by a stop member provided for limiting the maximum rotating motion of the frame portions relative to each other.

5. A vehicle frame as claimed in claim 4, in which the stop member consists of a wire which is freely displaceable in guide members on one frame portion and the ends of which are provided with abutment knobs capable of being stopped against abutments on the other frame portion on both sides of the universal joint.

* * * * *